L. SPIES.
BEVEL SQUARE.
APPLICATION FILED MAY 18, 1914.

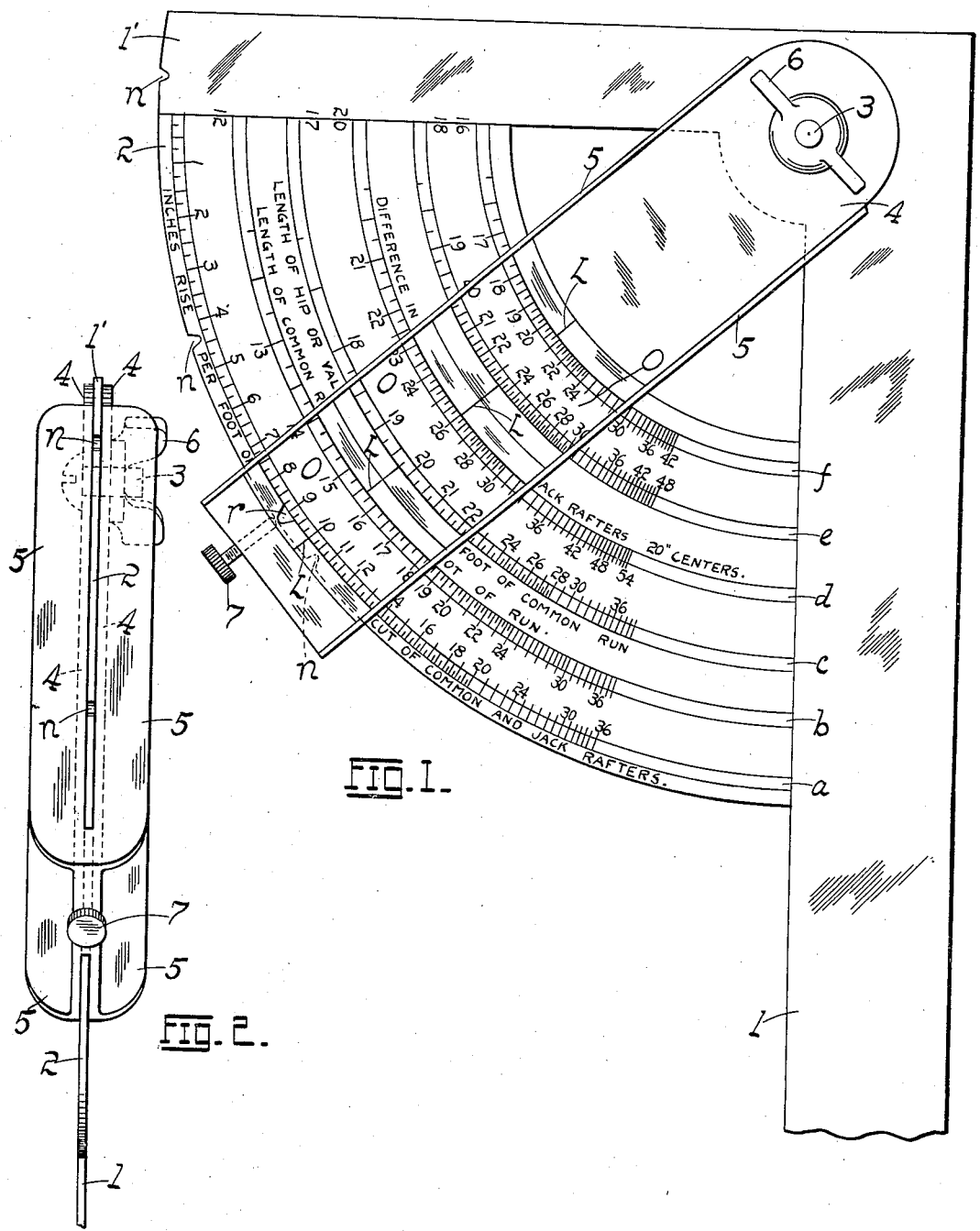

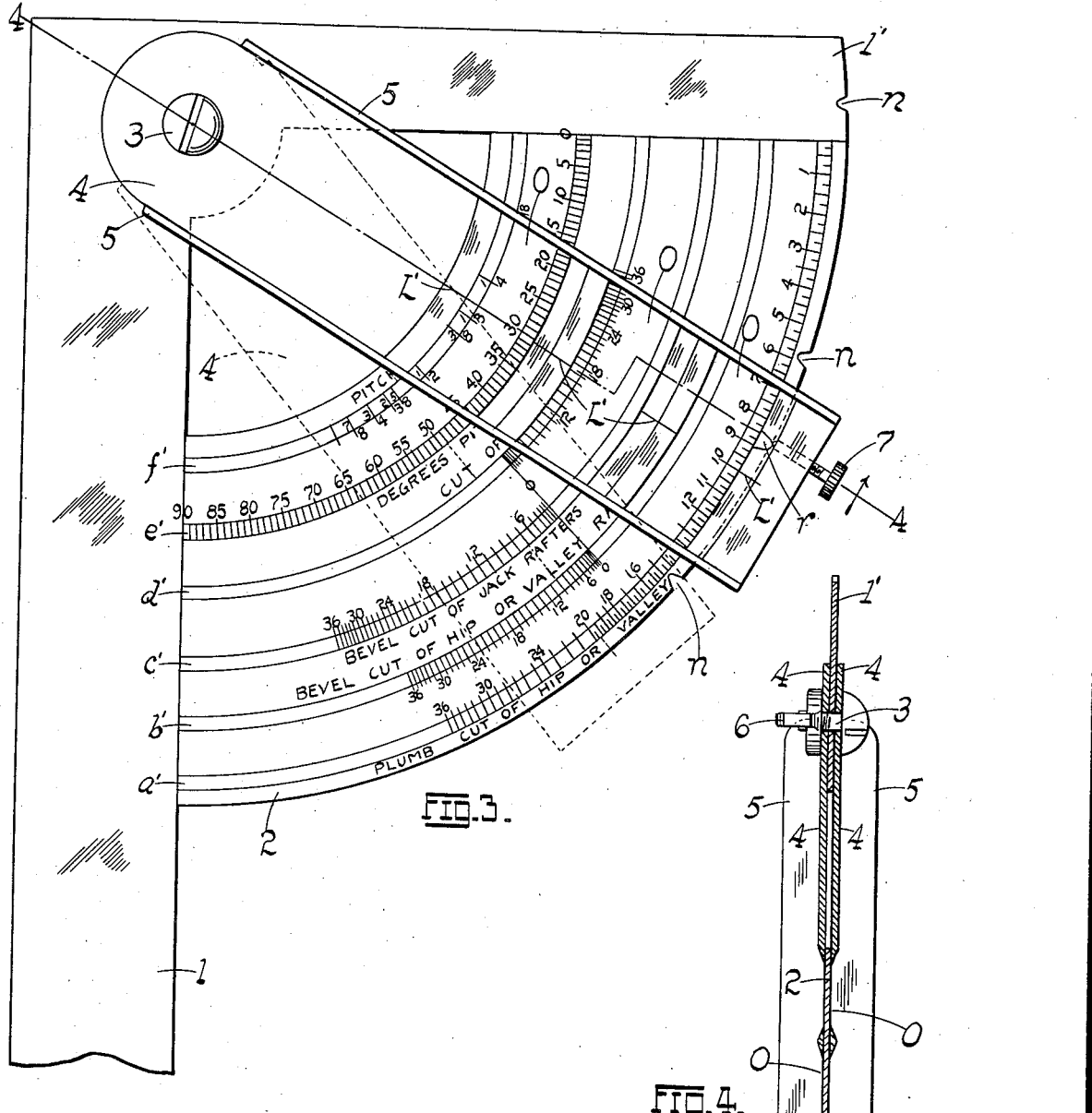

1,126,310.

Patented Jan. 26, 1915.
4 SHEETS—SHEET 3.

WITNESSES:
Harry A. Bennet
Josamichy

INVENTOR.
Louis Spies.
BY
ATTORNEY.

L. SPIES.
BEVEL SQUARE.
APPLICATION FILED MAY 18, 1914.
1,126,310. Patented Jan. 26, 1915.
4 SHEETS—SHEET 4.
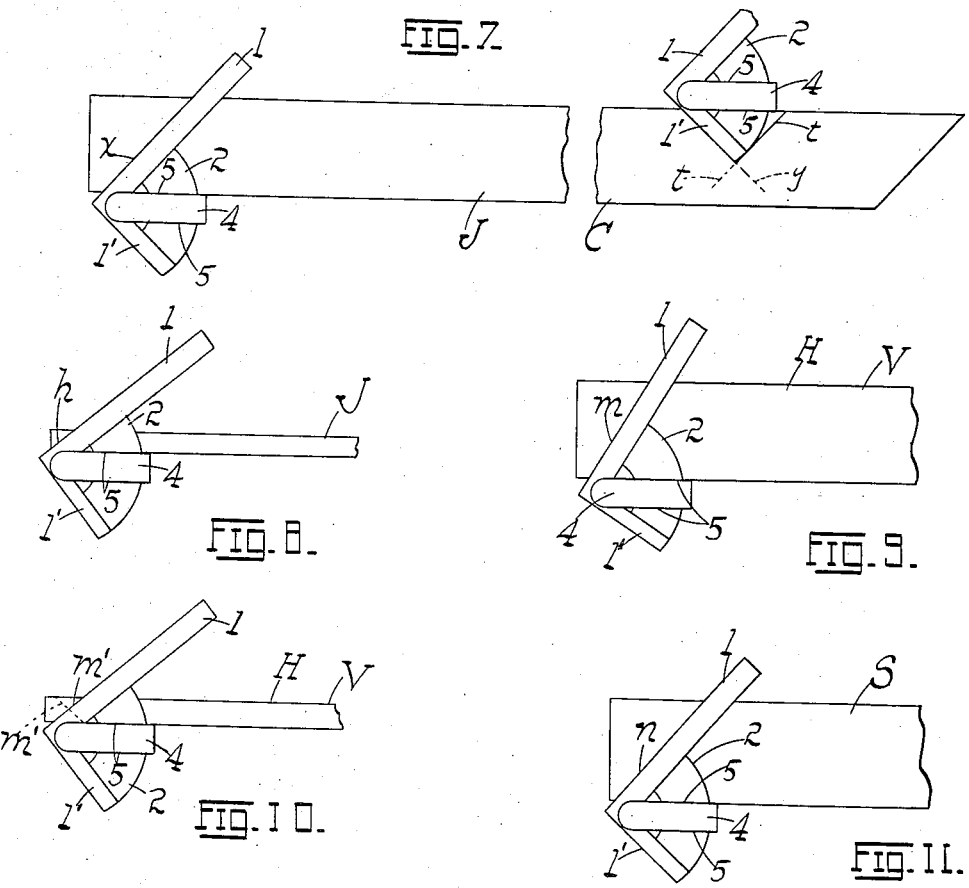
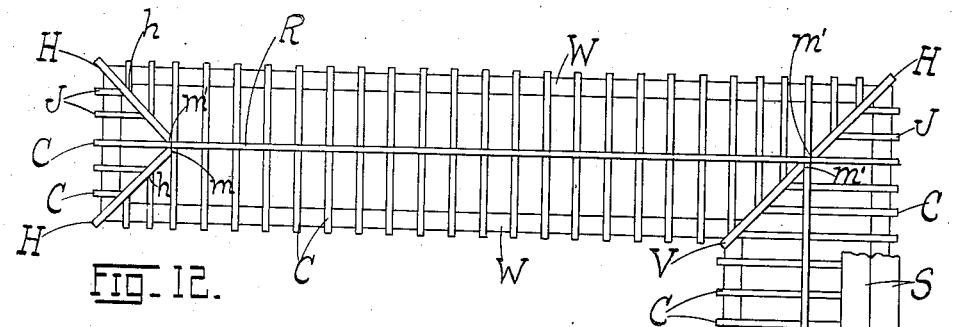
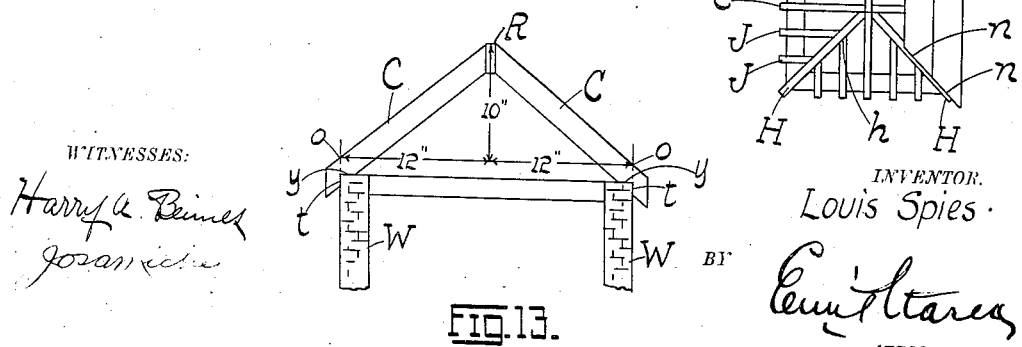
WITNESSES:
Harry A. Beimes
Josamich
INVENTOR.
Louis Spies
BY
ATTORNEY.

UNITED STATES PATENT OFFICE.

LOUIS SPIES, OF ST. LOUIS, MISSOURI.

BEVEL-SQUARE.

1,126,310.                Specification of Letters Patent.         Patented Jan. 26, 1915.

Application filed May 18, 1914.   Serial No. 839,443.

*To all whom it may concern:*

Be it known that I, LOUIS SPIES, a citizen of the United States, residing at St. Louis, State of Missouri, have invented certain new and useful Improvements in Bevel-Squares, of which the following is a full, clear, and exact description, reference being had to the accompanying drawings, forming a part hereof.

My invention has relation to improvements in bevel squares; and it consists in the novel features of construction more fully set forth in the specification and pointed out in the claims.

Figure 5:
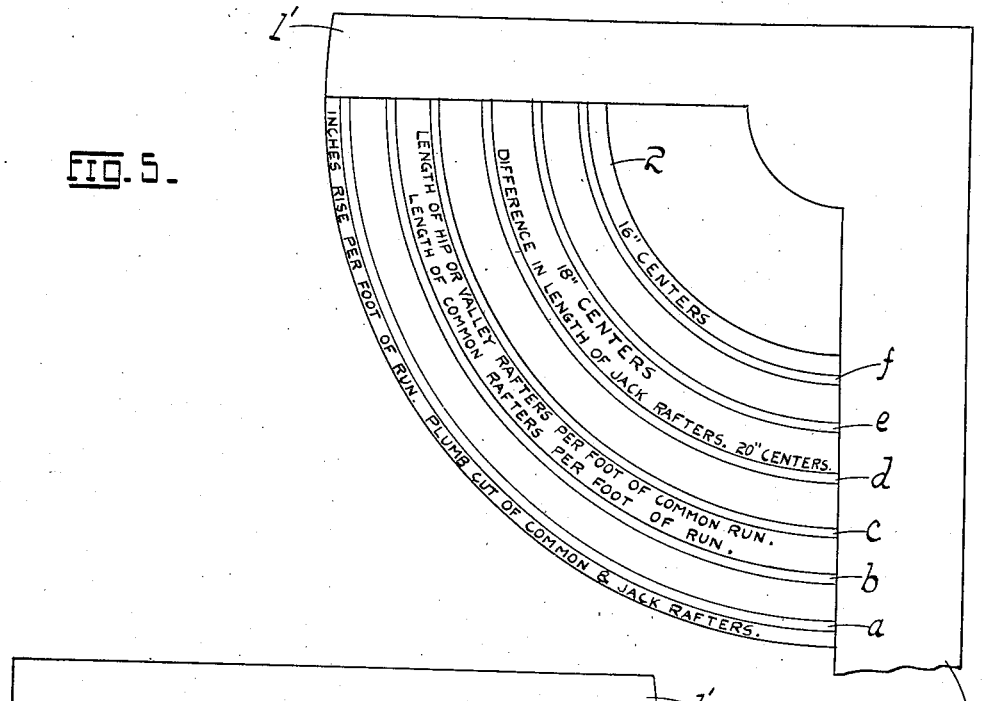
Figure 6:
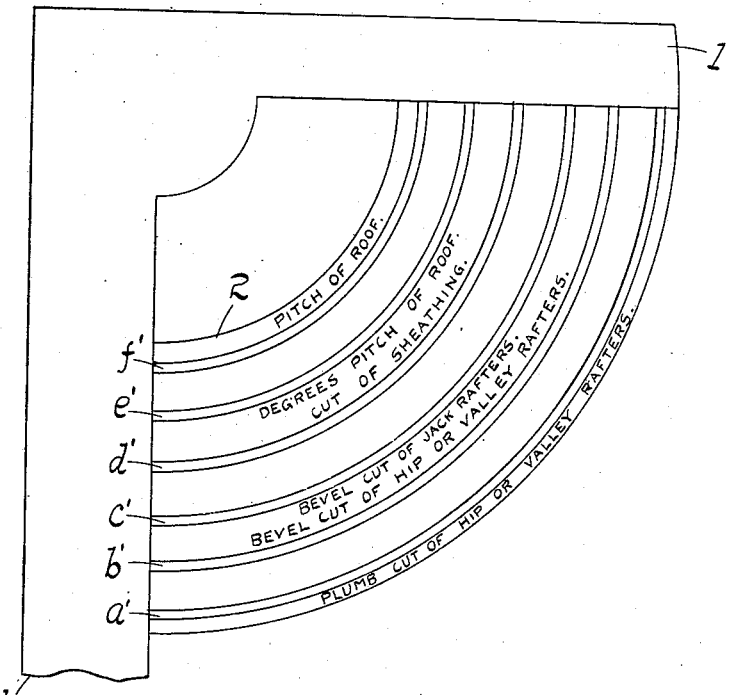

In the drawings, Figure 1 is a plan of one side of the square; Fig. 2 is an edge view of Fig. 1; Fig. 3 is a plan of the opposite side of the square; Fig. 4 is a cross-section on the line 4—4 of Fig. 3; Fig. 5 is a diagrammatic view showing the lettering on the face or side corresponding to Fig. 1; Fig. 6 is a diagrammatic view showing the lettering on the opposite side or that shown in Fig. 3; Figs. 7, 8, 9, 10 and 11 are diagrammatic views showing different modes of applying the square; Fig. 12 is a diagrammatic plan of the roofing members to which the present square is applicable; and Fig. 13 is a diagrammatic elevation of Fig. 12.

The present invention is an improvement on the square forming the subject-matter of my U. S. patent numbered 1,091,978 dated March 31, 1914; and while contemplating the several objects and possessing the various advantages of my patented construction, the present improvement dispenses with the "arbitrary" scale made use of in the patented square, and identified as scale "*d*" in said patent, said scale being represented in my present improvement by one which is in terms of inches rise per foot of (common) run.

A further object of the present improvement is to provide a scale which will give the angle of cut of the sheathing bearing against the hip or valley rafter; one which will give the difference in length between a common, and the first jack rafter removed therefrom, or the difference in length between any two consecutive jack-rafters for any fixed distance between the centers of the common and jack rafter, or between the centers of consecutive jack-rafters; one in which the readings of the "pitch" of roof or "degrees" pitch of roof are automatically convertible into readings of inches rise per foot of common run; one in which the scale indicating the inches rise per foot of common run determines not only the plumb cut of all the rafters, but the bevel cut of the hip, valley, and jack rafters; and one possessing further and other advantages better apparent from a detailed description of the invention, which is as follows:

Referring to the drawings, and for the present to Figs. 1 to 6 inclusive, 1, 1', represent the legs of the square disposed as usual at right angles to one another, the leg 1 being the longer. Disposed between the legs, and extending from the outer end of the leg 1', to an intermediate point along the leg 1, is a scale-plate or quadrant 2 on the opposite sides or faces of which are marked properly scaled or graduated arcs, there being six independent arcs on each face of the plate, to wit: arcs *a*, *b*, *c*, *d*, *e*, *f*, on one face, and arcs *a'*, *b'*, *c'*, *d'*, *e'*, *f'*, on the opposite face. The arc *a* is scaled to indicate "inches rise per foot of run" that is to say, what is known as common run and which will presently be again referred to; the arc *b* is scaled to indicate the "length of common rafters per foot of run"; the arc *c* is scaled to indicate the "length of hip or valley rafters per foot of common run"; the arc *d* is scaled to indicate the "difference in length of jack rafters, 20 inch centers"; the arc *e* is scaled to indicate the difference in length of jack rafters when at "18 inch centers"; the arc *f* is scaled to indicate the difference in length of jack rafters at "16 inch centers"; the arc *a'* is scaled to indicate the "plumb cut of hip or valley rafters"; the arc *b'* is scaled to indicate the "bevel cut of hip or valley rafters"; the arc *c'* is scaled to indicate the "bevel cut of jack rafters"; the arc *d'* is scaled to indicate the "cut of sheathing"; the arc *e'* is scaled to indicate the "degrees pitch of roof"; the arc *f'* is scaled to indicate the "pitch of roof." For any given rise in inches per foot of common run the scale *a* likewise gives the "plumb cut of common and jack rafters." Adapted to oscillate about the axis of a screw stud 3 disposed at the intersection of the extensions of the inner edges of the legs 1, 1', is a member formed preferably of a single piece of metal plate bent double or in the shape of a flat U, so as to span or envelop the scale-plate 2, the arms 4, 4, of the U-shaped member thus formed being bent into parallelism with the faces of the plate 2, whereby the arms will lie close to said faces. The sides of the respective arms are provided with flanges 5, 5, bent at right angles to the faces of the arms as shown. The member comprising the arms 4, 4, may be tightened more or less about its pivotal stud by a tightening nut 6, there being mounted in addition at the free end of said member, a set screw 7 adapted to engage the outer periphery or edge of the plate 2, to firmly hold the member 4, 4, in any position to which it may have been swung along the arcs referred to, or to enter any one of the peripheral notches n for permanently locking the swinging member against movement, the purpose of which notches will be presently referred to. For convenience, the member 4, 4, will be hereinafter referred to as the index member (either arm 4 being in fact such a member) because it carries or has marked thereon the necessary indices coöperating with the division marks of the arcs on the scale-plate 2. For example, the arm 4 opposite the arcs a, b, c, d, e, f, has a central index line L coöperating with the division marks of any of the arcs; and the arm 4 opposite the arcs a', b', c', d', e', f', has a corresponding index line L', portions of the material of the plate from which said arms are formed being removed so as to leave openings O through which the divisions on the several scales or arcs may be read. Preferably too, the surfaces which carry the lines L, L', are beveled to an edge at the sides of the openings O whereby the index lines will lead to the surfaces carrying the markings on the arc-scales, and there will be little or no strain on the eyes in reading the scales. The presence of the openings O virtually cuts up each index line L, L' into four sections, the outer section of the line L coöperating with scale a, the next succeeding section with scales b, c, the third section with scales d, e, and the fourth or inner section with scale f; and the outer section of the line L' coöperating with scale a', the next succeeding section with scales b', c', the third section with scales d', e', and the fourth or inner section with the scale f' as clearly obvious from the drawings.

Referring particularly to Fig. 13, and as fully explained in my patent aforesaid, the distance between the points o, o, on the common rafters C, C, is equal to twice the length of "common run," the rise being the vertical distance between the horizontal line connecting said points o, o, and the upper surface of the ridge R. In said figure as well as in Fig. 12, the supporting walls are represented by W, W, the common rafters by C, the hip rafters by H, the valley rafters by V, the ridge by R, the jack-rafters by J, and the sheathing (in Fig. 12) by S.

Like in my patent aforesaid, the inches rise per foot of common run forms the basis of all calculations, but those who are accustomed to the "pitch" or "degrees pitch" methods of calculation may automatically convert the pitch or degrees pitch to the inches rise per foot of run, by first setting the index line L' to the arc representing the pitch of roof, or degrees of pitch of roof on arcs f', e', and then by turning the instrument over and reading the line L against the arc a, the scale mark opposite said line L will give the inch rise per foot of run. For example, if the pitch is one-half (½), that is to say if the rise is equal to one-half the distance between the points o, o, Fig. 13, the arm 4 is swung to bring the index line L' opposite the mark ½ on the scale f' whereupon by turning the instrument over, we find that the index line L points to the numeral 12 on the arc a. Again, assuming that the carpenter is accustomed to dealing in "degrees" of pitch; if the angle between the common rafter and the horizontal plane connecting the points o, o, is 45 degrees, the arm 4 is swung until the index line L' comes opposite the numeral 45 on the scale or arc e', when by reading the scale a on the opposite side in connection with the index line L, we find that the latter points to 12 on said scale a, meaning that the inches rise per foot of common run corresponding to a 45 degree roof is 12, or one foot rise for each foot of common run. The foregoing examples will suffice to explain how one scale may be read in terms of another scale, and how readily a carpenter accustomed to a given method of designating or recognizing pitched roofs may automatically be directed to a scale based on inches rise per foot of common run. Basing therefore, all our calculations on the (inches) rise per foot of common run (the same as in my patent aforesaid), the application and operation of the present square is substantially as follows: Let us assume that we have a roof pitched to a rise of ten inches per foot of (common) run, or ten feet rise to twelve feet of (common) run (the roof under the circumstances being a ten-twenty-fourths or five-twelfths pitch or 40 degrees pitch, as may be readily ascertained by the method of calculation pointed out above). Let us now swing the index arm 4 until the outer section of the index line L is opposite the mark 10 on the scale of the arc a. The position of the arm 4 will at the same time give us the angle of the plumb cut of both the common and jack rafters, the position of the scale a being such that when we swing the arm 4 to a point which will register the inches rise per foot of run (always meaning common run) the outer edge of the leg 1 in conjunction with the adjacent flange 5 will give us the angle of the plumb cut for both the common and jack rafters (Fig. 1). At the same time, the arm 4 will give us the difference in length between the common and first jack rafter removed therefrom, or the difference in length between two consecutive jack rafters, when these rafters are 16 inches between centers, said difference being indicated on scale $f$, and being substantially 20¾ inches; when these rafters are 18 inches apart the difference in length is indicated on scale $e$, being substantially 23¼ inches; when the rafters are 20 inches apart, the difference in length is indicated on scale $d$ and is approximately 26 inches. This position of the arm 4 likewise gives us the length of hip or valley rafter per foot of run, indicated on scale $c$ which is substantially 19¾ inches; and finally the said position of the arm 4 likewise gives us the length of common rafters per foot of run indicated on scale $b$ which is approximately 15⅝ inches (Fig. 1). Thus, with the arm 4 set on scale $a$ to inches rise per foot of common run, we automatically and at the same time record the data indicated on scales $f$, $e$, $d$, $c$, and $b$, and the angle of the plumb cut of common and jack rafters on scale $a$. Still assuming that we are dealing with a roof pitched to a rise of ten inches per foot of common run, and bearing in mind that the scale on the arc $a$ forms the base of all subsequent calculations (the latter being all referable to such base), let us turn the instrument over and swing the index arm 4 to a point where the outer section of the index line L′ registers with the mark 10 on the scale $a'$ (Fig. 3). This position of the arm gives us the angle for the plumb cut of a hip or valley rafter, said angle being the one defined by the outer edge of the leg 1 and the adjacent flange 5 of the arm 4. Let us now swing the arm 4 (dotted position Fig. 3) until the next succeeding section of the index line L′ registers with the mark 10 on the scale $b'$. This position of the arm gives us the bevel cut for the hip or valley rafter. By swinging the arm 4 until the said section of the index line L′ registers with the mark 10 on the scale $c'$, we obtain the angle determining the bevel cut for the jack rafters; and by swinging the arm until the next succeeding section of the index line L′ registers with the mark 10 on the scale $d'$, we get the angle determining the cut of the sheathing S (see Fig. 12). As previously stated, the rise in inches per foot of run being automatically convertible into "pitch" and "degrees" of pitch of roof (and vice versa), if the carpenter desires to know to what pitch or degrees of pitch, a ten inch rise per foot of run corresponds, he simply swings the arm 4 until the outer section of the line L registers with the mark 10 on the scale $a$, when by turning over the istrument he will find that the innermost section of the index line L′ indicates on the scale $f'$ a point one third the distance between the ⅜ and ½ mark and nearest the ⅜ mark, or what is the equivalent to 10/24 or $\frac{5}{12}$ pitch; and the next succeeding section of the index line L′ will indicate the mark 40 on scale $e'$, showing that the "degree" of the roof pitch is 40. For convenience the outer edge of the scale plate is provided with notches $n$ set respectively at forty-five, twenty-two and one-half, and at zero degrees to which the arm 4 may be set, these notches corresponding to positions most frequently used for squaring and mitering. Since the tapered end of the screw 7 enters those notches when the arm is made fast, I provide the arm 4 with a recess $r$ at a point so as to swing across the notches with the swinging of the arm. This allows for a quick adjustment because the recess exposes the notch when it comes opposite thereto, and the carpenter can quickly drive the screw into the notch, the converging sides of the notch guiding the screw toward the base of the notch, and accurately adjusting the arm 4 to the pitch scale $f'$ and its coöperating scale $e'$.

The manner of applying the square is on the order of that described in detail in my patent aforesaid, Figs. 7 to 10 showing diagrammatically its application to various rafters. Thus in Fig. 7, the arm 4 having been swung to the position shown in Fig. 1, and locked to the plate 2, the square is laid on the rafter (J or C) as indicated in Fig. 7, and the rafter is cut along the line $x$ which gives the plumb cut (at the top) for either a common or jack rafter. By placing the flange 5 facing the leg 1′ against the opposite edge of the opposite end of the board and marking off the line $y$ the line determining the horizontal or "bottom cut" of either a common or jack rafter is obtained. The bottom plumb-cut along the line $t$ may be marked off the same as the line $x$ or by simply squaring it to the line $y$ in the ordinary way, said line $t$ being perpendicular to the line $y$. Assuming the arm 4 to be swung to its proper position along the scale $c'$ as described, the carpenter places the flange 5 facing the leg 1 against the face of the board adjacent the plumb cut and cuts along the line $h$ which gives him the bevel cut for the jack rafter (Fig. 8). Assuming the arm 4 to be swung to its proper position on the scale $a'$ (Fig. 3), and placing the flange 5 facing the leg 1 against the edge of the board, he cuts along the line $m$ which gives him the plumb cut for a hip or valley rafter (Fig. 9). Assuming the arm 4 to be swung to its proper position on the scale $b'$, and placing the flange 5 facing the leg 1 to first one face and then the other adjacent the plumb-cut of such hip or valley rafter, and marking off the lines $m'$, $m'$, we get the bevel cut for the hip or valley rafter (Fig. 10). In the present embodiment of my invention I provide likewise for the angle of cut of the sheathing. Assuming therefore that the arm 4 is swung to its proper position on the scale $d'$, the flange 5 adjacent the leg 1 is placed against the edge of the board S and the latter is cut along the line $n$ and we thus have the cut of the sheathing (Figs. 11, 12). To ascertain at a glance the difference in lengths between successive jack rafters (or a common rafter and the jack rafter first removed therefrom) placed at different distances between centers (such as 20 inches, 18 inches, 16 inches) for a given number of inches rise per foot of run, we have simply to set the arm 4 along the scale $a$ to the number indicating said inch rise (10 in Fig. 1) and we note on scale $d$ that the difference in length of jack rafters set at 20 inch centers is 26 inches; when set 18 inches between centers the difference in length is 23¼ inches (scale $e$); when set 16 inches between centers, the difference in length is 20¾ inches (scale $f$). We see from the foregoing that by setting the arm 4 along the scale $a$ to any given inches rise per foot of run (always meaning "common" run) we may at once and without shifting said arm read the scales $b$, $c$, $d$, $e$, $f$, $e'$, and $f'$; and the only shifting of said arm when once set along the scale $a$, will arise when it is necessary to read the results on scales $a'$, $b'$, $c'$, $d'$, in which cases the index line $L'$ of the arm 4 is set on these respective scales to the number or division corresponding to that indicating the number of inches rise per foot of run to which the index line L was originally set on the scale $a$. Thus the scale $a$ as a scale indicating inches rise per foot of common run, is here employed as a base for subsequent calculations, and the arbitrary scale as used in my patent aforesaid is entirely dispensed with, all readings herein being referable to the said scale $a$. The scale $e'$ may of course be used as an ordinary protractor, as quite obvious from the drawings. Obviously too, all the scales could be placed on one side or face of the scale plate 2 without departing from the nature or spirit of my invention; but their distribution over the two faces is desirable as it reduces the size of the instrument.

Having described my invention, what I claim is:—

1. In combination with a square having ruling edges intersecting at right angles, a scale plate between said edges provided with an arc graduated in terms of inches rise per foot of common run in a pitch roof, an index arm traversing the scale plate, and a series of concentric arcs on said scale plate positioned relatively to the first arc aforesaid to record, for any number of inches rise per foot of common run to which the index arm is set on the first arc, the corresponding lengths of common, hip and valley rafters per foot of common run.

2. In combination with a square having ruling edges intersecting at right angles, a scale plate between said edges provided with an arc graduated in terms of inches rise per foot of common run in a pitch roof, an index arm traversing the scale plate, and a series of concentric arcs on said scale plate positioned relatively to the first arc aforesaid to record, for any number of inches rise per foot of common run to which the index arm is set on the first arc, the corresponding lengths of common, hip and valley rafters per foot of common run, and the difference in lengths of jack rafters set to predetermined distances apart between centers.

3. In combination with a square having ruling edges intersecting at right angles, a scale plate between said edges provided with an arc graduated in terms of inches rise per foot of common run and indicating the angle of plumb cut of the common and jack rafters for any rise, an index arm traversing said scale plate, and a series of concentric arcs on said scale plate positioned relatively to the first arc aforesaid, to record, for any number of inches rise per foot of common run to which the index arm is set on the first arc, the corresponding lengths of common, hip and valley rafters per foot of common run.

4. In combination with a square having ruling edges intersecting at right angles, a scale plate between said edges provided with an arc graduated in terms of inches rise per foot of common run and indicating the angle of plumb cut of the common and jack rafters for any rise, a swinging index arm traversing said scale plate, and a series of concentric arcs on said scale plate positioned relatively to the first arc aforesaid, to record, for any number of inches rise per foot of common run to which the index arm is set on the first arc, the corresponding lengths of common, hip and valley rafters per foot of common run, and the difference in lengths of jack rafters set to predetermined distances apart between centers.

In testimony whereof I affix my signature, in presence of two witnesses.

LOUIS SPIES.

Witnesses:
 EMIL STAREK,
 JOS. A. MICHEL.